United States Patent [19]
Nishida

[11] Patent Number: 6,077,595
[45] Date of Patent: Jun. 20, 2000

[54] MAGNETIC RECORDING MEDIUM

[75] Inventor: Yasuhiro Nishida, Miyagi, Japan

[73] Assignee: Sony Corporation, Tokyo, Japan

[21] Appl. No.: 09/013,983

[22] Filed: Jan. 27, 1998

[30] Foreign Application Priority Data

Jan. 28, 1997 [JP] Japan ..................... 9-014299

[51] Int. Cl.$^7$ .................................. G11B 5/738
[52] U.S. Cl. .................. 428/212; 428/323; 428/694 BP; 428/694 BS; 428/900
[58] Field of Search .................... 428/212, 323, 428/694 BP, 900, 694 BS

[56] References Cited

U.S. PATENT DOCUMENTS

| | | | |
|---|---|---|---|
| 4,587,157 | 5/1986 | Brock et al. | 428/216 |
| 5,756,198 | 5/1998 | Tanaka | 428/323 |
| 5,776,596 | 7/1998 | Yamazaki et al. | 428/212 |

*Primary Examiner*—Stevan A. Resan
*Attorney, Agent, or Firm*—Hill & Simpson

[57] ABSTRACT

The present invention provides a magnetic recording medium having a preferable electro-magnetic conversion characteristic, while suppressing the self magnetization loss during recording and the thickness loss during reproduction and reducing the surface friction coefficient, which in turn improves the abrasion resistance, running condition, and durability.

The magnetic recording medium includes a non-magnetic support body, a non-magnetic layer containing at least a non-magnetic powder dispersed in a binder and formed on the non-magnetic support body, and one or more than one magnetic layers containing ferromagnetic powder dispersed in a binder, wherein the non-magnetic layer contains fatty acid and a magnetic layer serving as the uppermost layer contains alkyl carboxylic acid dimethyl amino alkyl ester. It is preferable that the non-magnetic layer contain 0.05 to 5 weight parts of fatty acid for 100 weight parts of the non-magnetic powder, and the magnetic layer serving as the uppermost layer contain 0.05 to 5 weight parts of alkyl carboxylic acid dimethyl amino alkyl ester for 100 weight parts of the ferromagnetic powder.

4 Claims, No Drawings

MAGNETIC RECORDING MEDIUM

BACKGROUND OF THE INVENTION

1. Field of the Invention

The present invention relates to a magnetic recording medium such as a magnetic tape and a magnetic disc which have a non-magnetic layer and a magnetic layer more particularly, to a magnetic recording medium having a non-magnetic layer and a magnetic layer which contain a particular compound so as to obtain an excellent abrasion resistance, running condition, and durability.

2. Description of the Prior Art

In a so-called coating-type magnetic medium having one or more than one magnetic layers formed by applying a magnetic coating mainly consisting of a very fine magnetic powder and a resin binder, in order to obtain a high recording density, the magnetic layer is made as a thin film so as to obtain an excellent electro-magnetic conversion characteristic especially in a short-wavelength band. It should be noted that such a thin film also reduces a self-demagnetization loss during a recording and a thickness loss during a reproduction.

However, if the magnetic layer is made as a thin film of 2 μm or below, the surface configuration of the non-magnetic support body affects the surface configuration of the magnetic layer, deteriorating the electro-magnetic conversion characteristic as well as causing a drop-out. To cope with this, between the non-magnetic support body and the magnetic layer, there is formed a non-magnetic layer having at least a non-magnetic powder dispersed in a binding material.

In the magnetic recording medium having such a configuration, it is possible to obtain an excellent electro-magnetic conversion characteristic in a short-wavelength and, because of the thinness of the magnetic layer, to reduce a self-demagnetization loss during a recording and a thickness loss during a reproduction. Furthermore, the thin magnetic layer also enables to reduce production costs.

However, if the magnetic layer is made as a thin film, the magnetic layer serving as the upper most layer can contain only a limited quantity of lubricant and abrasives and the friction coefficient is increased, which in turn deteriorates the abrasion resistance, running condition, and durability. Furthermore, the magnetic layer serving as the upper most layer should contain a ferromagnetic powder of a very small particle size, which lowers the film strength of the magnetic as well as deteriorates the running condition and durability because the magnetic layer has a more flat and smoothed surface.

To cope with this, it has been suggested to suppress the friction coefficient by containing various lubricants in the magnetic layer serving as the uppermost layer of the magnetic recording medium or forming a top coat layer of various lubricants coated on the aforementioned magnetic layer. As such lubricants, there can be exemplified higher fatty acid, its ester, paraffin, silicone, and the like. Especially, fatty acid is said to effectively suppress the friction.

However, even if such lubricants are used, it becomes difficult to sufficiently lower the friction coefficient because the magnetic layer has a flat and smoothed surface.

Moreover, in the aforementioned magnetic recording medium, as the magnetic powder has a very small size, even if fatty acid is contained in the magnetic layer or used to form a top coat layer, the fatty acid mostly adsorbs to the magnetic powder and, in order to obtain a sufficient effect of the fatty acid, it is necessary to increase the quantity of the fatty acid added. However, if such a great quantity of fatty acid is added, this brings about lowering of the magnetic characteristic of the magnetic layer as well as deterioration of the running condition and durability because the magnetic layer becomes plasticized.

SUMMARY OF THE INVENTION

It is therefore an object of the present invention to provide a magnetic recording medium having a preferable electro-magnetic conversion characteristic, enabling to suppress a self-demagnetization loss during a recording and a thickness loss during a reproduction and has a low surface friction coefficient, a preferable abrasion resistance, running condition, and durability.

The inventors of the present invention studied in order to achieve the aforementioned object and found that in a magnetic recording medium having a non-magnetic layer and a magnetic layer stratified on a non-magnetic support body, the fatty acid contained in the non-magnetic layer significantly affects the surface friction coefficient of the magnetic recording medium. Moreover, if fatty acid is contained in the non-magnetic layer, it is possible to reduce the quantity of the fatty acid to be contained in the magnetic layer as the upper layer, enabling to suppress deterioration of the magnetic characteristic of the magnetic layer and to suppress deterioration of the running durability due to plasticization of the magnetic layer. Furthermore, the inventors found that if the magnetic layer serving as the upper-most layer contains alkyl carboxylic dimethyl amino alkyl ester, it is possible to further improve the running condition and durability.

In order to achieve the aforementioned object, the present invention provides a magnetic recording medium comprising a non-magnetic support body, a non-magnetic layer containing at least non-magnetic powder dispersed in a binder and formed on the non-magnetic support body, and one or more than one magnetic layers containing ferromagnetic powder dispersed in a binder and formed on the non-magnetic layer, wherein the non-magnetic layer contains fatty acid and a magnetic layer serving as an uppermost layer contains alkyl carboxylic acid dimethyl amino alkyl ester.

Note that it is preferable that in the magnetic recording medium according to the present invention, the non-magnetic layer contain 0.05 to 5 weight parts of the fatty acid for 100 weight parts of the non-magnetic powder. Furthermore, it is more preferable that the content of the fatty acid be 0.2 to 2 weight parts.

If the content of the fatty acid is below 0.05 weight parts, it is impossible to obtain a sufficient lubrication effect, increasing the surface friction coefficient of the magnetic recording medium, which in turn deteriorates durability including still durability. On the other hand, if the aforementioned content of the fatty acid is above 5 weight parts, the non-magnetic support body as a lower layer cannot exhibit a sufficient adhesion strength and plasticization lowers the durability such as running durability.

Moreover, in the magnetic recording medium according to the present invention, it is preferable that the magnetic layer serving as the uppermost layer contain 0.05 to 5 weight parts of alkyl carboxylic dimethyl amino alkyl ester for 100 weight parts of the ferromagnetic powder. Furthermore, it is more preferable that the aforementioned content be 0.2 to 2 weight parts.

If the aforementioned content of the alkyl carboxylic dimethyl amino alkyl ester is below 0.05, it is impossible to obtain a sufficient lubrication effect, failing to sufficiently improve the running condition and durability. On the other hand, if the aforementioned content of alkyl carboxylic acid dimethyl amino alkyl ester is above 5 weight parts, the magnetic head easily adheres to the magnetic tape, which lowers the running condition.

DETAILED DESCRIPTION OF THE PREFERRED EMBODIMENTS

The magnetic recording medium according to the present invention will be detailed below.

The aforementioned fatty acid to be contained in the non-magnetic layer may be lauric acid, myristic acid, palmitic acid, stearic acid, isostearic acid, oleic acid, linoleic acid, linolenic acid, behenic acid, elaidic acid, and the like, which can be used as a single fatty acid or in combination.

On the other hand, the magnetic layer contains alkyl carboxylic acid dimethyl amino alkyl ester having a structure as shown below.

[Chemical Formula 1]

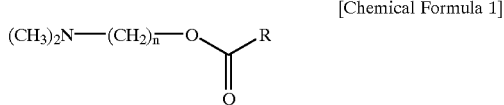

In the above Chemical Formula 1, R represents a hydro carbon group having 11 or more carbons; and n is an integer 10 or below. If the hydro carbon group R has 10 or less carbons, the lubrication effect is lowered. However, the lubrication characteristic of this alkyl carboxylic acid dimethyl amino alkyl ester is saturated when the hydro carbon group R has about 18 carbons. Consequently, the hydro carbon group R has essentially the upper limit of 20 carbons. It should be noted that if the number n of the carbons in the carbon chain of the alkyl carboxylic acid dimethyl amino alkyl ester is more above 10, it becomes difficult to synthesize such a material and the number of carbons n is limited to 10 or below.

In the magnetic recording medium according to the present invention, the magnetic layer may contain another lubricant together with the aforementioned alkyl carboxylic acid dimethyl amino alkyl ester.

As such a lubricant, there can be exemplified: fatty acid ester, higher fatty acid alcohol, monoalkyl phosphate, dialkyl phosphate, trialkyl phosphate, paraffin, silicone oil, animal oil, vegetable oil, mineral oil, higher aliphatic amine, graphite, silica, molybdenum disulfide, tungsten disulfide, and the like as inorganic fine powder; resin powder of polyethylene, polypropylene, polyvinyl chloride, ethylene-vinyl chloride copolymer, polytetrafluoroethylene, and the like; α-olefin polymer, unsaturated aliphatic hydro carbon which is a liquid at the room temperature, fluoro carbon, and the like. It should be noted that the aforementioned lubricants may also be contained in the non-magnetic layer.

Hereinafter, further detailed description will given on the contents of the magnetic recording medium according to the present invention.

Firstly, description will be given on the contents of a magnetic layer serving as the upper most layer. There is no particular limitation to the ferromagnetic powder to be contained in the magnetic layer. There can be exemplified: ferromagnetic $CrO_2$, ferromagnetic cobalt ferrite ($COO$—$Fe_2O_3$), cobalt-adsorbed oxide, ferromagnetic Fe—Co—Ni alloy, hexagonal barium ferrite, iron nitride, and the like as fine powder.

When the aforementioned ferromagnetic iron oxide fine particle is expressed as a general formula $FeO_x$, the value x is in the range of $1.33<x<1.51$, that is maghemite ($\gamma$-$Fe_2O_3$, x=1.5), magnetite ($Fe_3O_4$, x=4/3), and the solid solution of these materials. Furthermore, in order to increase anti-magnetic force, cobalt may added to these ferromagnetic iron oxides.

As the aforementioned ferromagnetic chrome dioxide, it is possible to use CrO or CrO with addition of at least one Ru, Sn, Te, Sb, Fe, Ti, V, Mn, and the like for increasing the anti-magnetic force.

As the ferromagnetic alloy powder, it is possible to use a Fe ally powder, Co alloy powder, Ni alloy powder, and an alloy powder such as Fe—Co, Fe—Ni, Fe—Co—Ni, Co—Ni, Fe—Co—B, Fe—Co—Cr—B, Mn—Bi, Mn—Al, Fe—Co—V, and the like; or z mixed powder of a compound consisting of these alloys and other elements.

There is no particular limitation to the configuration of the ferromagnetic powder particles, and it is possible to use, for example, needle-shaped particles, granular particle, cubic-shaped particles, rice grain-shaped particles, plate-shaped particles, and the like. In the case of needle shape, the needle ratio is in the order of 3/1 to 30/1, and more preferably 4/1 or above. When considering the electro-magnetic conversion characteristic, this ferromagnetic powder preferably has a specific surface of 40 $m^2/g$ or above, and more preferably, 45 $m^2/g$ or above.

Moreover, as a binder to be contained in the magnetic layer, it is possible to use conventional known materials such as a thermoplastic resin, thermo-setting resin, cross-linked resin by radial rays such as electron beam, and mixtures of these materials.

The aforementioned thermoplastic resin preferably has a softening temperature of 150° C. or below, an average molecular weight of 10000 to 200000 and degree of polymerization in the order of 200 to 2000. There can be exemplified: vinyl chloride-vinyl acetate copolymer, vinyl chloride-vinylidene chloride, vinyl chloride-acrylonitrile copolymer, acrylic acid ester-acrylonitrile copolymer, acrylic acid ester-vinylidene chloride copolymer, acrylic acid ester-styrene copolymer, methacrylic acid ester-acrylonitrile copolymer, methacrylic acid ester-vinylidene chloride copolymer, methacrylic acid ester-styrene copolymer, urethane elastomer, polyvinyl fluoride, vinylidene chloride-acrylonitirile copolymer, butadiene-acrylonitrile copolymer, polyamide resin, polyvinyl butyral, cellulose derivative (cellulose acetate butyrate, cellulose diacetate, cellulose triacetate, cellulose propyonate, nitrocellulose, and the like), styrene-butadiene copolymer, polyester resin, thermoplastic resin of various synthetic rubber (polybutadine, polychloroprene, polyisoprene, styrene butadiene copolymer, and the like), and mixtures of these materials.

Moreover, as the thermo-setting resin, there can be exemplified phenol resin, epoxy resin, polyurethane setting type resin, urea resin, melamine resin, alkyd resin, silicone resin, polyamine resin, ureaformaldehyde resin, and the like.

It should be noted that if molecules of the aforementioned resins used as binders have an acid group such as —$SO_3H$, —$OSO_3H$, —$PO_3H_2$, —$OPO_3H_2$, —COOH or their salts or a polar group such as hydroxyl group, epoxy group, amino group and the like, it is possible to obtain more excellent dispersion and coating durability. Among these materials, especially preferable to have —$SO_3Na$, —COOH, $OPO_3Na_2$, and —$NH_2$ groups.

In the magnetic recording medium according to the present invention, it is preferable that the magnetic layer preferably contain inorganic particles having Moh's hardness of 5 or above.

There is no particular limitation to the inorganic particles used if the Moh's harness is 5 or above. As such inorganic particles having Moh's hardness of 5 or above, there can be exemplified $Al_2O_3$ (Moh's harness 9), TiO (Moh's hardness 6), $TiO_2$ (Moh's hardness 6.5), $SiO_2$ (Moh's hardness 7), $SnO_2$ (Moh's hardness 6.5), $Cr_2O_3$ (Moh's harness 9), $\alpha\text{-}Fe_2O_3$ (Moh's hardness 5.5), and the like. These can be used either as a single material or in combination. It should be noted that the inorganic particles have more preferably the Moh's hardness of 8 or above. When a comparatively soft inorganic particle having the Moh's hardness lower than 5 is used, the inorganic particle is easily removed from the magnetic layer and has almost no function to polish the head, which leads to the head clogging and deteriorates the running durability. Such an inorganic particle is to be contained normally in the range of 0.1 to 20 weight parts and preferably in the range of 1 to 10 weight parts for 100 weight parts of the ferromagnetic powder.

When preparing a magnetic coating material, it is possible to add an anti-static additive besides the aforementioned components.

As the anti-static additives, there can be exemplified: conductive fine powder of carbon black, carbon black graphite polymer, and the like; natural surface active agent such as saponin; nonion surface active agent such as alkylene oxide, glycerin, glycidol, and the like; cathion surface active agent such as higher alkylaine, fourth class ammonium slat, pyridine, salts of other heterocyclic compounds, phosphonium or sulfonium; anion surface active agent containing an acid group such as such as carboxylic acid, phosphoric acid, sulphuric acid ester group, phosphoric acid ester group, and the like; amphoteric surface active agent such as amino acid, aminosulfonic acid, amino alcohol sulfuric or phosphoric ester, and the like. When using the aforementioned conductive fine powder as an antistatic additive, it is used, for example, in the range from 0.1 to 10 weight parts for 100 weight parts of the ferromagnetic powder, and in the range of 0.12 to 10 weight parts when a surface active agent is used.

Description will now be directed to components of the non-magnetic layer serving as a lower layer according to the present invention. As the non-magnetic powder, there can be exemplified: needle-shaped hematite, goethite, rutile-type titanium dioxide, anatase-type titanium dioxide, carbon black, stannum oxide, tungsten oxide, silicone oxide, zinc oxide, chrome oxide, cerium oxide, titanium carbide, BN, $\alpha$-alumina, $\beta$-alumina, $\gamma$-alumina, calcium sulfide, barium sulfide, molybdenum disulfide, magnesium carbonate, barium carbonate, strontium carbonate, barium titanate, and the like. Moreover, the aforementioned non-magnetic pigment may be doped with a proper quantity of impurities according to the purpose. The non-magnetic pigment is preferably has a specific surface of 5 to 100 $m^2/g$ and more preferably, 20 to 70 $m^2/g$. When the specific surface is within the aforementioned range, the non-magnetic pigment has a fine granular configuration and the lower layer is made flat and smoothed, which in turn brings about the flat and smoothed upper layer, enabling to obtain an excellent magnetic recording medium having an excellent modulation noise characteristic and the least spacing loss effects. If the specific surface is greater than the aforementioned range, dispersion in the coating becomes difficult, and if the specific surface is too small, it becomes impossible to obtain a flat and smoothed surface durable for a high density recording.

Moreover, the binder to be contained in the non-magnetic layer serving as a lower layer should satisfy the conditions of the dispersion capability of the non-magnetic pigment in the non-magnetic layer and the uniformity between the upper and the lower surfaces. As a binder satisfying these conditions, similarly as the binders in the upper layer, it is possible to use conventional known binders such as thermoplastic resin, thermo-setting resin, resin cross-lined by radial rays such as electron beam, and mixture of these materials.

Moreover, as a binder to be contained in the magnetic layer, it is possible to use conventional known materials such as a thermoplastic resin, thermo-setting resin, cross-linked resin by radial rays such as electron beam, and mixtures of these materials.

The aforementioned thermoplastic resin preferably has a softening temperature of 150 C or below, an average molecular weight of 10000 to 200000 and degree of polymerization in the order of 200 to 2000. There can be exemplified: vinyl chloride-vinyl acetate copolymer, vinyl chloride-vinylidene chloride, vinyl chloride-acrylonitrile copolymer, acrylic acid ester-acrylonitrile copolymer, acrylic acid ester-vinylidene chloride copolymer, acrylic acid ester-styrene copolymer, methacrylic acid ester-acrylonitrile copolymer, methacrylic acid ester-vinylidene chloride copolymer, methacrylic acid ester-styrene copolymer, urethane elastomer, polyvinyl fluoride, vinylidene chloride-acrylonitirile copolymer, butadiene-acrylinitrile copolymer, polyamide resin, polyvinyl butyral, cellulose derivative (cellulose acetate butyrate, cellulose diacetate, cellulose triacetate, cellulose propyonate, nitrocellulose, and the like), styrene-butadiene copolymer, polyester resin, thermoplastic resin of various synthetic rubber (polybutadine, polychloroprene, polyisoprene, styrene butadiene copolymer, and the like), and mixtures of these materials.

Moreover, as the thermo-setting resin, there can be exemplified phenol resin, epoxy resin, polyurethane setting type resin, urea resin, melamine resin, alkyd resin, silicone resin, polyamine resin, ureaformaldehyde resin, and the like.

It should be noted that if molecules of the aforementioned resins used as binders have an acid group such as $-SO_3H$, $-OSO_3H$, $-PO_3H_2$, $-OPO_3H_2$, $-COOH$ or their salts or a polar group such as hydroxyl group, epoxy group, amino group and the like, it is possible to obtain more excellent dispersion and coating durability. Among these materials, it is especially preferable to have $-SO_3Na$, $-COOH$, $-OPO_3Na_2$, and $-NH_2$ groups.

When preparing the aforementioned non-magnetic coating material, it is possible to add an anti-static additive besides the aforementioned components.

As the anti-static additives, there can be exemplified: conductive fine powder of carbon black, carbon black graphite polymer, and the like; natural surface active agent such as saponin; nonion surface active agent such as alkylene oxide, glycerin, glycidol, and the like; cathion surface active agent such as higher alkylaine, fourth class ammonium slat, pyridine, salts of other heterocyclic compounds, phosphonium or sulfonium; anion surface active agent containing an acid group such as such as carboxylic acid, phosphoric acid, sulfuric acid ester group, phosphoric acid ester group, and the like; amphoteric surface active agent such as amino acid, aminosulfonic acid, amino alcohol sulfuric or phosphoric ester, and the like. When using the aforementioned conductive fine powder as an antistatic additive, it is used, for example, in the range from 0.01 to 10 weight parts for 100 weight parts of the ferromagnetic powder, and in the range of 0.12 to 10 weight parts when a surface active agent is used.

Description will now be directed to a production method of the magnetic recording medium according to the present invention.

Firstly, as for the magnetic layer serving as an upper layer, the magnetic coating material is prepared by kneading a ferromagnetic material and a binder, and if necessary a bulking agent and an additive, with a solvent.

As a solvent to be used for kneading, there can be exemplified: ketone solvent such as acetone, methylethyl ketone, methyl isobutyl ketone, cyclohexane, and the like; alcohol solvent such as methanol, ethanol, propanol, and the like; ester solvent such as methyl acetate, ethyl acetate, butyl acetate, propyl acetate, ethyl lactate, ethylene glycol acetate, and the like; ether solvent such as diethylene glycol dimethyl ether, 2-etoxyethanol, tetrahydrofuran, dioxane, and the like; aromatic hydro carbon solvent such as benzene, toluene, xylene, and the like; hydro carbon halide solvent such as methylene chloride, ethylene chloride, carbon tetrachloride, chloroform, chlorobenzene, and the like, which are used in combination as is necessary.

There is no particular limitation to a kneading method or adding order of the respective components. For preparing the magnetic coating material, a conventional kneading machine can be used such as two-roll mill, three-roll mill, ball mill, pebble mill, trone mill, sand grinder, zegbarry, atriter, high-speed impeller dispersion apparatus, high-speed stone mill, high-speed shock mill, disper kneader, high-speed mixer, homogenizer, ultra-sonic dispersion apparatus, and the like.

Next, a non-magnetic coating material to form a lower layer is prepared by kneading a non-magnetic pigment and a binder, and if necessary a bulking agent and an additive, with a solvent.

As a solvent to be used for kneading, similarly as in the magnetic layer serving as the upper layer, there can be exemplified: ketone solvent such as acetone, methylethyl ketone, methyl isobutyl ketone, cyclohexane, and the like; alcohol solvent such as methanol, ethanol, propanol, and the like; ester solvent such as methyl acetate, ethyl acetate, butyl acetate, propyl acetate, ethyl lactate, ethylene glycol acetate, and the like; ether solvent such as diethylene glycol dimethyl ether, 2-etoxyethanol, tetrahydrofuran, dioxane, and the like; aromatic hydro carbon solvent such as benzene, toluene, xylene, and the like; hydro carbon halide solvent such as methylene chloride, ethylene chloride, carbon tetrachloride, chloroform, chlorobenzene, and the like, which are used in combination as is necessary.

There is no particular limitation to a kneading method or adding order of the respective components. For preparing the non-magnetic coating material, a conventional kneading machine can be used such as two-roll mill, three-roll mill, ball mill, pebble mill, trone mill, sand grinder, zegbarry, atriter, high-speed impeller dispersion apparatus, high-speed stone mill, high-speed shock mill, disper kneader, high-speed mixer, homogenizer, ultra-sonic dispersion apparatus, and the like.

The magnetic and the non-magnetic coating materials thus prepared are applied onto a non-magnetic support body.

As the non-magnetic support body used in the present invention, it is possible to use polyester such as polyethlene terephthalate, polyethylene 2, and 6-naphthalate; polyolefin such as polyethylene and polypropyrene; cellulose derivative such as cellulose triacetate; plastic such as polycarbonate, polyimide, and polyamideimide as well as plastic onto which a metal such as aluminium is deposited. The non-magnetic support body may have any form of film, tape, sheet, and the like, and the materials are selected according to the form and the necessity.

The coating may be carried out directly to the non-magnetic support body or through an additive layer. As for the direct application to the non-magnetic support body, there can be exemplified: air doctor coating, blade coating, rod coating, extrusion coating, air knife coating, squeeze coating, impregnation coating, reverse roll coating, transfer roll coating, gravure coating, kiss coating, cast coating, spray coating, spin coating methods and the like. It is also possible to employ a so-called went-on-wet coating method in which the lower layer coating liquid and the magnetic layer coating liquid are applied while being lubricant-state overlaid.

It should be noted that the magnetic layer thus applied preferably has a thickness of 1.5 $\mu$m or below and more preferably, 1.0 $\mu$m or below, and further preferably, 0.5 $\mu$m or below. The non-magnetic support body preferably has a thickness of 2 to 50 $\mu$m.

When the magnetic recording medium produced is used in a tape shape, the magnetic layer applied on the non-magnetic support body is subjected to a magnetic field orientation processing for orienting the ferromagnetic powder in the magnetic layer and then dried, which is then subjected to a surface smoothing processing if necessary.

In the magnetic recording medium according to the present invention, a non-magnetic layer containing at least a non-magnetic powder dispersed in a binder is formed on a non-magnetic support body, upon which one or more than one magnetic layers containing ferromagnetic powder dispersed in a binder are formed; and the aforementioned non-magnetic layer contains a fatty acid. Consequently, the friction coefficient of the surface of the magnetic recording medium is significantly reduced. Moreover, as the non-magnetic layer contains fatty acid, it is possible to reduce the content of fatty acid to be contained in the magnetic layer which serves as the upper layer, which suppresses deterioration of magnetic characteristic of the magnetic layer or deterioration of running durability due to plasticization of the magnetic layer.

Furthermore, in the magnetic recording medium according to the present invention, as the magnetic layer serving as the upper most layer contains alkyl carboxylic acid dimethyl amino alkyl ester, it is possible to further enhance the running condition and durability.

EXAMPLES

In the magnetic recording medium according to the present invention, a non-magnetic layer containing at least a non-magnetic powder dispersed in a binder is formed on a non-magnetic support body, upon which one or more than one magnetic layers containing ferromagnetic powder dispersed in a binder are formed, wherein the non-magnetic layer contains a fatty acid and the magnetic layer serving as the uppermost layer contains alkyl carboxylic acid dimethyl amino alkyl ester.

Moreover, in the magnetic recording medium according to the present invention, it is preferable that the non-magnetic layer contain 0.05 to 5 weight parts of fatty acid for 100 weight parts of the non-magnetic powder, and the magnetic layer serving as the uppermost layer contain 0.05 to 5 weight parts of alkyl carboxylic acid dimethyl amino alkyl ester for 100 weight parts of the ferromagnetic powder.

In the magnetic recording medium according to the present invention, as a non-magnetic layer and a magnetic layer are formed, it is possible to form the magnetic layer as a thin film. Consequently, it is possible to obtain an excellent electro-magnetic conversion characteristic in the short wavelength band as well as to reduce the self demagnetization loss during recording and a thickness loss during reproduction. Furthermore, because it is possible to make the magnetic layer a thin film, it is also possible to reduce production costs.

Moreover, in the magnetic recording medium according to the present invention, as the aforementioned non-magnetic layer contains fatty acid, the magnetic recording medium can significantly reduce the friction coefficient of its surface. Furthermore, as the non-magnetic layer contains fatty acid, it is possible to reduce the content of fatty acid in the magnetic layer serving as the upper layer, which enables to suppress deterioration of the magnetic characteristic of the magnetic layer and deterioration of the running durability due to plasticization of the magnetic layer.

Furthermore, in the magnetic recording medium according to the present invention, as the magnetic layer serving as the uppermost layer contains alkyl carboxylic acid dimethyl amino alkyl ester, it is possible to further enhance the running condition and durability.

In order to confirm the effects of the present invention, the following tests were carried out.

<Sample Preparation>

A sample was prepared as a magnetic tape having a non-magnetic layer and one magnetic layer formed on a non-magnetic support body. Firstly, a magnetic coating material to form the magnetic layer and a non-magnetic coating material to form the non-magnetic layer were prepared. Each of the coating materials are prepared according to a conventional production method. Each of them was prepared by mixing a pigment (ferromagnetic powder and a non-magnetic powder), binder, additive, solvent and the like, and kneaded them by using a kneader so as to obtain 85 weight % of non-volatile content during kneading. After this, the magnetic coating material was dispersed for 5 hours by using a sand mill, and the non-magnetic coating material was dispersed for 3 hours by using a sand mill. The magnetic coating material and the non-magnetic coating material have compositions as follows.

| Magnetic Coating Material | |
|---|---|
| Ferromagnetic Power: Fe metal ferromagnetic powder (specific surface 51 m$^2$/g) | 100 weight parts |
| Binder: polyvinyl chloride resin (Polymerization degree 150; containing as a polar group, 5 × 10$^{-5}$ mol/g of sodium sulfonic acid) | 14 weight parts |
| Binder: polyester polyurethane resin (containing as a polar group, 1 × 10$^{-4}$ mol/g of sodium sulfonic acid) | 6 weight parts |
| Additive: Carbon | 2 weight parts |
| Additive: Al$_2$O$_3$ (Primary particle size 0.09 μm added as a slurry, the center particle size 0.17 μm) | 5 weight parts |
| Solvent: methylethyl ketone | 150 weight parts |
| Solvent: cyclohexanon | 150 weight parts |
| Non-magnetic Coating Material | |
| Non-magnetic powder: α-iron oxide (Si3 at % processed; needle ratio 8; longer axis length 0.18 μm) | 100 weight parts |
| Binder: polyvinyl chloride resin (polymerization degree 150; containing 5 × 10$^{-5}$ mol/g sodium sulfonic acid as a polar group) | 14 weight parts |
| Binder: polyester polyurethane resin (containing 1 × 10$^{-4}$ mol/g of sodium sulfonic acid as a polar group) | 6 weight parts |
| Solvent: methylethyl ketone | 105 weight parts |
| Solvent: cyclohexanon | 105 weight parts |

For the magnetic coating material and the non-magnetic coating material obtained as described above, one weight part of lubricant and butyl stearate was added. Moreover, 0.5 weight parts of myristic acid was added to the non-magnetic coating material; and 0.5 weight parts or alkyl carboxylic acid dimethyl amino alkyl ester (n-C$_{17}$H$_{35}$COO(CH$_2$)$_3$N(CH$_3$)$_2$) was added to the magnetic coating material, which were mixed for 30 minutes. Furthermore, as a setting agent, 4 weight parts of polyisocyanate was added to the magnetic coating material and 2 weight parts of polyisocyanate was added to the non-magnetic coating material so as to complete the magnetic coating material and the non-magnetic coating material.

By using a four-lip dye coater, the magnetic coating material and the non-magnetic coating material was applied onto a non-magnetic support material made from a polyethylene terephthalate base having a thickness of 4.5 μm by way of simultaneous stratified application so that the non-magnetic coating material is the lower layer and the magnetic coating material is the upper layer. The obtained object was subjected to an orientation processing by using a solenoid coil, dried, and subjected to a calendar processing, and a setting processing. For this processing, the magnetic layer was set to have a thickness of 0.15 μm when dried, and the non-magnetic layer was set to have 2.0 μm when dried. Furthermore, a backing material was applied to the opposite surface of the non-magnetic support material having no magnetic layer or non-magnetic layer. The backing material was prepared as described below and applied to have a thickness of 0.5 μm. After this, the support material was cut into 8 mm width so as to obtain a magnetic tape sample. This magnetic tape sample will be referred to as Example 1.

| Backing Material | |
|---|---|
| Carbon black: Asahi #50 (trade name) produced by Asahi Carbon Co., Ltd. | 100 weight parts |
| Polyester polyurethane: Nipporan N-2304 (trade name) produced by Nippon Polyurethane Co., Ltd. | 100 weight parts |
| Methylethyl ketone | 500 weight parts |
| Toluene | 5000 weight parts |

Next, the quantity of the myristic acid and the quantity of the alkyl carboxylic acid dimethyl amino alkyl ester (n-C$_{17}$H$_{35}$COO(CH$_2$)$_3$N(CH$_3$)$_2$) to be added to the magnetic coating material and the non-magnetic coating material were changed as shown in Table 1 below for producing the magnetic coating material and the non-magnetic coating material, which were used to produce magnetic tapes as Examples 2 to 9 in the same way as Example 1.

Furthermore, non-magnetic coating materials and magnetic coating materials were prepared by changing the quantity of the myristic acid to be added to the non-magnetic coating material as shown in Table 1 below and by adding 6 weight parts of alkyl carboxylic acid dimethyl amino alkyl ester (n-C$_{17}$H$_{35}$COO(CH$_2$)$_3$N(CH$_3$)$_2$) to the magnetic coating material, so as to produce magnetic tapes as Examples 10 to 12 in the same way as Example 1.

TABLE 1

|  | Myristic acid added into magnetic layer | Myristic acid added into non-magnetic layer | Lubricant A* added into magnetic layer |
|---|---|---|---|
| Example 1 | None | 0.5 | 0.5 |
| Example 2 | None | 1.0 | 0.5 |
| Example 3 | None | 2.0 | 0.5 |
| Example 4 | None | 0.5 | 1.0 |
| Example 5 | None | 1.0 | 1.0 |
| Example 6 | None | 2.0 | 1.0 |
| Example 7 | None | 0.5 | 2.0 |
| Example 8 | None | 1.0 | 2.0 |
| Example 9 | None | 2.0 | 2.0 |
| Example 10 | None | 0.5 | 6.0 |
| Example 11 | None | 1.0 | 6.0 |
| Example 12 | None | 2.0 | 6.0 |
| Comparative Example 1 | 0.5 | None | None |
| Comparative Example 2 | 1.0 | None | None |
| Comparative Example 3 | 2.0 | None | None |
| Comparative Example 4 | None | 0.5 | None |
| Comparative Example 5 | None | 1.0 | None |
| Comparative Example 6 | None | 2.0 | None |
| Comparative Example 7 | 6.0 | 2.0 | None |
| Comparative Example 8 | None | 0.01 | None |
| Comparative Example 9 | None | 6.0 | None |

*Lubricant A is alkyl carboxylic acid dimethyl amino alkyl ester (n-$C_{17}H_{35}$COO$(CH_2)_3$N$(CH_3)_2$)

Furthermore, for comparison, non-magnetic coating materials and magnetic coating materials were prepared by changing the quantity of the myristic acid to be added to the non-magnetic coating material as shown in Table 1 and no alkyl carboxylic acid dimethyl amino alkyl ester (n-$C_{17}H_{35}$COO$(CH_2)_3$N$(CH_3)_2$) to the magnetic coating paint, so as to prepare magnetic tapes in the same way as Example 1, to obtain Comparative Examples 1 to 9.

<Sample Evaluation>

Next, in order to evaluate Examples 1 to 9 and Comparative Examples 1 to 9 thus obtained, the abrasion resistance, running condition, still durability, and shuttle durability were checked for the respective magnetic tapes thus obtained.

These checks were carried out under the conditions of: temperature 25° C. and relative humidity 60%; temperature 40° C. and relative humidity 80%; and temperature −5° C. The aforementioned still durability was determined according to the attenuation time required for attenuation of 3 dB of the output in the pause state. The aforementioned shuttle durability was determined by carrying out shuttle running for 3 minutes for each time and the attenuation time was determined for attenuation of 3 dB of the output in the same way as the still durability. Table 2 shows the check results of Examples 1 to 6, Table 3 shows the check results of Examples 7 to 12, and Table 4 shows the check results of Comparative Examples 1 to 9.

TABLE 2

|  | Conditions | Friction coefficient | Still durability (min) | Shuttle durability (Number of times) |
|---|---|---|---|---|
| Example 1 | 25° C., 60% RH | 0.16 | >120 | >150 |
|  | 40° C., 80% RH | 0.19 | >120 | >150 |
|  | −5° C. | 0.17 | >120 | >150 |
| Example 2 | 25° C., 60% RH | 0.16 | >120 | >150 |
|  | 40° C., 80% RH | 0.18 | >120 | >150 |
|  | −5° C. | 0.17 | >120 | >150 |
| Example 3 | 25° C., 60% RH | 0.15 | >120 | >150 |
|  | 40° C., 80% RH | 0.17 | >120 | >150 |
|  | −5° C. | 0.16 | >120 | >150 |
| Example 4 | 25° C., 60% RH | 0.16 | >120 | >150 |
|  | 40° C., 80% RH | 0.19 | >120 | >150 |
|  | −5° C. | 0.17 | >120 | >150 |
| Example 5 | 25° C., 60% RH | 0.16 | >120 | >150 |
|  | 40° C., 80% RH | 0.18 | >120 | >150 |
|  | −5° C. | 0.17 | >120 | >150 |
| Example 6 | 25° C., 60% RH | 0.15 | >120 | >150 |
|  | 40° C., 80% RH | 0.17 | >120 | >150 |
|  | −5° C. | 0.16 | >120 | >150 |

TABLE 3

|  | Conditions | Friction coefficient | Still durability (min) | Shuttle durability (Number of times) |
|---|---|---|---|---|
| Example 7 | 25° C., 60% RH | 0.16 | >120 | >150 |
|  | 40° C., 80% RH | 0.19 | >120 | >150 |
|  | −5° C. | 0.17 | >120 | >150 |
| Example 8 | 25° C., 60% RH | 0.16 | >120 | >150 |
|  | 40° C., 80% RH | 0.18 | >120 | >150 |
|  | −5° C. | 0.17 | >120 | >150 |
| Example 9 | 25° C., 60% RH | 0.15 | >120 | >150 |
|  | 40° C., 80% RH | 0.17 | >120 | >150 |
|  | −5° C. | 0.16 | >120 | >150 |
| Example 10 | 25° C., 60% RH | 0.20 | >120 | >150 |
|  | 40° C., 80% RH | 0.22 | 42 | >150 |
|  | −5° C. | 0.21 | 57 | 120 |
| Example 11 | 25° C., 60% RH | 0.18 | >120 | >150 |
|  | 40° C., 80% RH | 0.20 | 49 | >150 |
|  | −5° C. | 0.19 | 68 | 110 |
| Example 12 | 25° C., 60% RH | 0.17 | >120 | >150 |
|  | 40° C., 80% RH | 0.19 | 55 | >150 |
|  | −5° C. | 0.18 | 65 | 100 |

TABLE 4

|  | Conditions | Friction coefficient | Still durability (min) | Shuttle durability (Number of times) |
|---|---|---|---|---|
| Comparat. example 1 | 25° C., 60% RH | 0.26 | >120 | >150 |
|  | 40° C., 80% RH | 0.28 | 67 | 140 |
|  | −5° C. | 0.31 | 50 | 100 |
| Comparat. example 2 | 25° C., 60% RH | 0.25 | >120 | >150 |
|  | 40° C., 80% RH | 0.27 | 66 | 130 |
|  | −5° C. | 0.30 | 52 | 95 |
| Comparat. example 3 | 25° C., 60% RH | 0.25 | >120 | >150 |
|  | 40° C., 80% RH | 0.27 | 78 | 120 |
|  | −5° C. | 0.30 | 62 | 110 |
| Comparat. example 4 | 25° C., 60% RH | 0.17 | >120 | >150 |
|  | 40° C., 80% RH | 0.20 | 88 | >150 |
|  | −5° C. | 0.18 | 95 | >150 |
| Comparat. example 5 | 25° C., 60% RH | 0.18 | >120 | >150 |
|  | 40° C., 80% RH | 0.20 | 90 | >150 |
|  | −5° C. | 0.19 | 75 | >150 |
| Comparat. example 6 | 25° C., 60% RH | 0.16 | >120 | >150 |
|  | 40° C., 80% RH | 0.20 | 90 | >150 |

TABLE 4-continued

|  | Conditions | Friction coefficient | Still durability (min) | Shuttle durability (Number of times) |
|---|---|---|---|---|
|  | −5° C. | 0.18 | 80 | >150 |
| Comparat. example 7 | 25° C., 60% RH | 0.20 | >120 | >150 |
|  | 40° C., 80% RH | 0.40 | 65 | >150 |
|  | −5° C. | 0.20 | 110 | >150 |
| Comparat. example 8 | 25° C., 60% RH | 0.26 | >120 | >150 |
|  | 40° C., 80% RH | 0.28 | 100 | >150 |
|  | −5° C. | 0.31 | 110 | >150 |
| Comparat. example 9 | 25° C., 60% RH | 0.28 | >120 | >150 |
|  | 40° C., 80% RH | 0.34 | 64 | >150 |
|  | −5° C. | 0.32 | 88 | >150 |

As can be seen from Table 2, Table 3, and Table 4, there is no significant difference in the friction coefficient between Examples 1 to 12 in which the non-magnetic layer contains myristic acid which is a fatty acid and the magnetic layer serving as the upper most layer contains alkyl carboxylic acid dimethyl amino alkyl ester and Comparative Examples 4 to 9 in which the non-magnetic layer contains myristic acid which is a fatty acid but the magnetic layer serving as the uppermost layer contains no alkyl carboxylic acid dimethyl amino alkyl ester because both of them contains fatty acid in the non-magnetic layer serving as the lower layer. It should be noted that in Comparative Examples 1 to 3 containing no fatty acid in the non-magnetic layer, the friction coefficient is increased. Moreover, in these Comparative Examples 1 to 3, although the magnetic layer serving as the uppermost layer contains fatty acid, no effect can be obtained to reduce the friction coefficient.

When the still durability and the shuttle durability are taken into consideration, preferable results were obtained in Examples 1 to 12 containing alkyl carboxylic acid dimethyl amino alkyl ester in the magnetic layer serving as the uppermost layer, but no preferable results were obtained in Comparative Examples 1 to 9 not containing alkyl carboxylic acid dimethyl amino alkyl ester in the magnetic layer serving as the uppermost layer.

That is, from these results it was found that if the non-magnetic layer as the lower layer contains fatty acid and the magnetic layer as the uppermost layer contains alkyl carboxylic acid dimethyl amino alkyl ester, it is possible to maintain lubricity under any conditions for a long time and reduce the friction coefficient, improving the still durability and the shuttle durability, enhancing the abrasion resistance, the running condition, and the durability.

Moreover, when the results of Examples 1 to 9 are compared to the results of Examples 10 to 12, in Examples 10 to 12 containing a comparatively large quantity of alkyl carboxylic acid dimethyl amino alkyl ester in the magnetic layer as the uppermost layer, the adhesion strength to the non-magnetic layer as the lower layer is decreased and the plasticization lowers the running durability, decreasing the still durability and the shuttle durability.

As is clear from the above description, in the magnetic recording medium according to the present invention, on a non-magnetic support body is formed a non-magnetic layer containing a non-magnetic powder dispersed in a binder, on which layer is formed one or more than one magnetic layers containing ferromagnetic powder dispersed in a binder, wherein the non-magnetic layer contains fatty acid. Consequently, the magnetic recording medium has a surface having a significantly reduced friction coefficient. Moreover, as the non-magnetic layer contains fatty acid, it is possible to reduce the content of the fatty acid in the magnetic layer as the upper layer, which in turn enables to suppress deterioration of the magnetic characteristic of the magnetic layer as well as to suppress lowering of the running durability due to plasticization.

Furthermore, in the magnetic recording medium according to the present invention, the magnetic layer serving as the uppermost layer contains alkyl carboxylic acid dimethyl amino alkyl ester, which further improves the running condition and durability.

Moreover, in the magnetic recording medium according to the present invention, the non-magnetic layer and the magnetic layer are stratified and it is possible to make the magnetic layer as a thin film. consequently, it is possible to obtain an excellent electro-magnetic conversion characteristic in the short wavelength band, enabling to reduce the self demagnetization loss during recording and the thickness loss during reproduction. Furthermore, as the magnetic layer can be made thin, it is possible to reduce production costs as well.

What is claimed is:

1. A magnetic recording medium comprising a non-magnetic support body, a non-magnetic layer containing at least non-magnetic powder dispersed in a binder and formed on said non-magnetic support body, and one or more than one magnetic layers containing ferromagnetic powder dispersed in a binder and formed on said non-magnetic layer, wherein said non-magnetic layer contains fatty acid in an amount ranging from 0.05 to 5 weight parts of the fatty acid for 100 weight parts of the non-magnetic powder and the magnetic layer serving as an uppermost layer contains alkyl carboxylic acid dimethyl amino alkyl ester.

2. A magnetic recording medium as claimed in claim 1, wherein said non-magnetic layer contains 0.2 to 2 weight parts of the fatty acid for 100 weight parts of the non-magnetic powder.

3. A magnetic recording medium as claimed in claim 1, wherein said magnetic layer serving as the uppermost layer contains 0.05 to 5 weight parts of alkyl carboxylic dimethyl amino alkyl ester for 100 weight parts of the ferromagnetic powder.

4. A magnetic recording medium as claimed in claim 1, wherein said magnetic layer serving as the uppermost layer contains 0.2 to 2 weight parts of alkyl carboxylic dimethyl amino alkyl ester for 100 weight parts of the ferromagnetic powder.

* * * * *